United States Patent [19]

Kluth et al.

[11] Patent Number: 4,742,087
[45] Date of Patent: May 3, 1988

[54] POLYURETHANE PREPOLYMERS BASED ON OLEOCHEMICAL POLYOLS, THEIR PRODUCTION AND USE

[75] Inventors: Hermann Kluth, Duesseldorf; Bert Gruber, Bedberg; Alfred Meffert, Monheim; Wilfried Huebner, Langenfeld, all of Fed. Rep. of Germany

[73] Assignee: Henkel Kommanditgesellschaft auf Aktien, Duesseldorf, Fed. Rep. of Germany

[21] Appl. No.: 80,024

[22] Filed: Jul. 31, 1987

[30] Foreign Application Priority Data

Aug. 2, 1986 [DE] Fed. Rep. of Germany ....... 3626223

[51] Int. Cl.$^4$ ........................................... C08G 18/30
[52] U.S. Cl. .................................... 521/107; 521/115; 521/129; 521/131; 521/137; 521/138; 521/140; 521/159; 521/164; 521/167; 521/170; 521/172; 521/173
[58] Field of Search ............... 521/107, 115, 129, 131, 521/137, 138, 140, 159, 164, 167, 172, 173, 170

[56] References Cited

U.S. PATENT DOCUMENTS

| | | | |
|---|---|---|---|
| 3,830,760 | 8/1974 | Bengtson | 260/2.5 |
| 4,258,140 | 3/1981 | Horacek et al. | 521/114 |
| 4,508,853 | 4/1985 | Kluth et al. | 521/107 |
| 4,546,120 | 10/1985 | Peerman et al. | 521/172 |

Primary Examiner—Maurice J. Welsh
Assistant Examiner—S. A. Acquah
Attorney, Agent, or Firm—Ernest G. Szoke; Henry E. Millson, Jr.

[57] ABSTRACT

The invention relates to isocyanate-terminated polyurethane prepolymers containing a stoichiometric excess of an isocyanate component comprised of one or more aromatic isocyanates containing on average from 2 to 4 isocyanate groups per molecule and a polyol component comprised of an oleochemical polyol prepared by epoxidation of a triglyceride containing olefinic unsaturation and subsequent ring opening with an alcohol. In use, accelerators, flameproofing agents, blowing agents and, optionally, liquefying agents, dyes and/or stabilizers, are included. The oleochemical polyol does not contain any free epoxide groups and is obtained by complete ring opening of epoxidized triglycerides of a fatty acid mixture containing at least partly olefinically unsaturated fatty acids with one or more $C_1$–$C_{12}$ alcohols and partial conversion by alcoholysis or transesterification of the triglyceride derivatives to alkyl ester polyols containing from 1 to 12 carbon atoms in the alkyl radical. A process for the production of these polyurethane prepolymers and to their use as starting materials for the production of polyurethane foams is included.

20 Claims, No Drawings

POLYURETHANE PREPOLYMERS BASED ON OLEOCHEMICAL POLYOLS, THEIR PRODUCTION AND USE

BACKGROUND OF THE INVENTION

1. Field of the Invention

This invention relates to polyurethane prepolymers of an isocyanate component and a polyol component. These isocyanate-terminated prepolymers are constituents of formulations for moisture-hardening foams.

2. Description of Related Art

Polyurethane prepolymers have long been known. They are used in various compositions in the adhesives field. Recently, however, they have been used to an increasing extent for formulations for the production of foams which have acquired increasing significance in the construction field by virtue of their moisture-, cold- and sound-insulating properties. So-called "one-component" polyurethane foams are preferred for use in such applications. The one-component polyurethane foams are mixtures of polyurethane prepolymers, accelerators, viscosity reducing agents, blowing agents and other auxiliaries which are marketed in moisture proof pressurized containers and which harden on release from these pressurized containers, i.e. on contact with atmospheric moisture or water vapor, to form solid foams.

U.S. Pat. No. 3,830,760 proposes a process for the production of polyurethane foams of this type. To this end, a polyurethane prepolymer is prepared from tolylene diisocyanate or crude diphenylmethane diisocyanate and a polyol having a molecular weight of at least 300. On release from a suitable pressurized container, this prepolymer expands and then hardens in the presence of the moisture in the surrounding atmosphere. The polyol used is a polyol formed from an alkylene oxide by reaction with compounds containing several active hydrogen atoms. Prepolymers prepared using other suitable polyol components are also described.

According to U.S. Pat. No. 4,258,140, polyurethane prepolymers intended for the same purpose may also be prepared using polyester and/or polyether polyols containing tertiary amino groups and from 2 to 8 hydroxy groups as the polyol component.

To produce the foams, the prepolymer mixtures mentioned in the publications cited above are foamed with fluorinated and/or chlorinated hydrocarbons which have boiling points at atmospheric pressure preferably below room temperature.

All the hitherto mentioned foams produced by the disclosed processes show unsatisfactory fire behavior. In the fire test according to DIN 4102, Part 1, they have to be classified as "readily inflammable" (classification B3). The typical maximum flame heights of foams such as these are from 20 to 30 cm. Accordingly, building regulations often stipulate that foams of the type in question should not be used in building construction for safety reasons. Accordingly, there is a need for polyurethane foams having improved fire behavior (DIN 4102 classification: at least B2 "normally inflammable"). Although a certain improvement in fire behavior may be obtained with bromide-containing flameproofing agents, this would involve other disadvantages, including an adverse effect on the hardening reaction and instability of the prepolymers through an increase in viscosity in the mixture.

U.S. Pat. No. 4,508,853 describes polyurethane prepolymers which are free from most of the disadvantages mentioned above. The polyol components of the prepolymer mixtures disclosed are oleochemical polyols which have been obtained by complete or partial ring-opening of epoxidized triglycerides (fats or oils of native origin) with monohydric or polyhydric alcohols. These oleochemicals polyols which originally contained some olefinic unsaturation for epoxidation optionally contain residual epoxide groups and have an overall functionality (OH and epoxide groups) of from 2.0 to 4.0. Accordingly, the polyol components disclosed in this publication are derivatives of triglycerides of native origin which originally contained olefinic double bonds, are epoxidized by known methods and have to be completely or partly reacted with monohydric or polyhydric alcohols. The fire behavior of the polyurethane foams produced from polyurethane prepolymer mixtures containing polyols such as these tends to be more favorable than that of the compositions of U.S. Pat. Nos. 3,380,760 and 4,258,140 mentioned above. However, the mixtures show a marked increase in viscosity with decreasing temperature, and since processibility at low ambient temperatures is important and critical for use in the construction field, further improvement in viscosity behavior is desirable.

DESCRIPTION OF THE INVENTION

Accordingly, the object of the present invention is to provide new polyurethane prepolymer mixtures based on oleochemical raw materials which are derived from triglycerides of a fatty acid mixture containing some olefinic unsaturation, i.e. at least partly olefinically unsaturated fatty acids, which show distinctly better fire behavior when foamed, than the hitherto known mixtures. In addition, the prepolymer mixtures prepared using the polyols are intended to show viscosity behavior which enables them to be processed even at low temperatures. In this connection, compatibility of the raw materials with the accelerator systems and other constituents of such mixtures hitherto known and successfully used for this purpose, such as blowing agents, dyes and/or stabilizers, is important.

The present invention relates to polyurethane prepolymers containing terminal isocyanate groups which are prepared from (1) an isocyanate component of a stoichiometric excess of one or more aromatic isocyanates containing on average from 2 to 4 isocyanate groups per molecule and (2) a polyol component containing an oleochemical polyol prepared from at least partly unsaturated triglycerides by epoxidation and subsequent ring opening with an alcohol as the polyol component, characterized in that the polyol component contains at least one, i.e. one or more ester polyols of oleochemical origin which do not contain any free epoxide groups and which have been prepared by complete ring opening of epoxidized triglycerides of fatty acid mixtures containing at least partly olefinically unsaturated fatty acids with one or more $C_1$–$C_{12}$ alcohols and subsequent partial conversion by alcoholysis or transesterification of the triglyceride derivatives to alkyl ester polyols containing from 1 to 12 carbon atoms in the alkyl radical. In use the prepolymers will also optionally contain accelerators, flameproofing agents, blowing agents and, liquefying agents, dyes and/or stabilizers.

The present invention also relates to a process for the production of polyurethane prepolymers containing an isocyanate component and a polyol component. The invention further relates to the use of the new polyurethane prepolymer optionally in admixture with conventional catalysts or accelerators, flameproofing agents, blowing agents, liquefying agents, dyes and/or stabilizers. As noted above the polyol component contains an oleochemical polyol prepared from epoxidized triglycerides of a fatty acid mixture containing olefinic unsaturation, and subsequent ring opening with an alcohol. The oleochemical polyol is characterized in that the epoxidized triglycerides of fatty acid mixtures containing at least partly olefinically unsaturated fatty acids are subjected to complete ring opening with one or more $C_1$-$C_{12}$ alcohols and the resulting triglyceride derivatives formed are preferably transesterified in the presence of one or more $C_1$-$C_{12}$ alcohols. The polyol component thus formed is mixed under pressure with the isocyanate component and, optionally, the accelerators, flameproofing agents, blowing agents, liquefying agents, dyes and/or stabilizers at temperatures of from 5° to 30° C.

The present invention also relates to the use of the polyurethane prepolymers mentioned as starting materials for the production of polyurethane foams.

The polyurethane prepolymers according to the invention are based on aromatic isocyanates containing from 2 to 4 isocyanate groups as isocyanate component. Suitable isocyanates are both isocyanates which contain all the NCO groups on an aromatic ring or on several conjugated aromatic rings and also isocyanates in which the NCO groups are bound to several rings attached to one another by alkylene groups, for example methylene groups. Examples of suitable isocyanates are 2,4-tolylene diisocyanate and 4,4'-diphenylmethane diisocyanate, of which the latter is preferred. Mixtures of 4,4'-diphenylmethane diisocyanate with isocyanates of higher functionality may also be used, for example, with substituted diphenylmethane diisocyanates containing as substituent another aromatic ring containing NCO-groups. Commercial, liquid crude mixtures of diphenylmethane diisocyanate containing oligomeric polyphenylene-polymethylene polyisocyanates are preferred. Of these liquid crude mixtures, those having an average functionality of from 2 to 3.0, or 2 to 2.5, isocyanate groups per molecule may be used with particular advantage. The effect which the functionality of the isocyanate component or the polyol component has on the crosslinking density and hence on the hardness and brittleness of the polyurethanes is known to the expert. In this connection, reference may be made to the general specialist literature, cf. for example Saunders and Frisch "Polyurethanes, Chemistry and Technology", Vol. XVI of the series "High Polymers", Interscience Publishers, New York, parts 1 and 2.

The polyurethane prepolymers according to the invention contain in the polyol component an oleochemical polyol prepared from at least partly unsaturated triglycerides by epoxidation and subsequent ring opening with an alcohol. In the context of the invention, therefore, oleochemical polyols are understood to be reaction products of epoxidized triglycerides of fatty acid mixtures containing at least partly ethylenically unsaturated fatty acids with alcohols.

Starting materials for the oleochemical polyols of the polyurethane prepolymers according to the invention are fats and/or oils of vegetable and/or animal origin in which the fatty acid portion or radical contains unsaturated fatty acid residues, such as for example soya oil, linseed oil and castor oil. Beef tallow, palm oil, peanut oil, sunflower oil and fish oils are also suitable. The unsaturated fatty acid residues in natural oils such as these are epoxidized by methods known per se so that the olefinically unsaturated fatty acid residues are converted into acyl radicals containing a number of epoxy groups corresponding to the original number of olefinic double bonds. Triglycerides having epoxide numbers of from about 3 to about 8 are obtained. Epoxidized soybean oil and sunflower oil generally will have an epoxide number in the range of about 5.6 to about 6.6 while linseed oils may have epoxide numbers in excess of 8 such as 8.2 to 8.6.

The reaction of the epoxidized triglycerides mentioned with alcohols leads to the oleochemical polyols usable in accordance with the invention. In these oleochemical polyols, the fatty acid residues carry a hydroxy group and an alkoxy group at the positions epoxidized in the preceding reaction step. These groups are introduced during ring opening with a monohydric $C_1$-$C_{12}$ alcohol, preferably a $C_1$-$C_3$ alcohol. If the alcohol is selected from the group comprising methanol, ethanol, n-propanol and/or i-propanol, methanol being preferred for this reaction, the polyol components of the polyurethane prepolymers according to the invention carry a hydroxy group and a methoxy, ethoxy and/or propoxy group at the corresponding fatty acid acyl radicals, those compounds in which a hydroxy group and a methoxy group occur as substituents again being preferred. Up to about 10 to 15 mole % of the monofunctional alcohol may be replaced by bifunctional alcohols, such as ethylene glycol, propanediol or diethylene glycol.

In contrast to the prior art where the triglycerides are directly used, the polyol components of the polyurethane prepolymers according to the invention are distinguished by the fact that they contain as polyol component the alkyl ester polyols formed preferably by transesterification with an alcohol. In this connection, it is pointed out that, in one preferred embodiment of the invention, the polyol component of the polyurethane prepolymers is a methyl ester polyol. Polyurethane prepolymers containing methyl ester polyols as polyol component show favorable properties in regard to fire behaviour and stability in storage of the prepolymer mixtures and are also preferred by virtue of their ready availability.

In view of the foregoing the oleochemical polyol obtained after complete opening of the ring followed by subsequent conversion with an alcohol (alcoholysis or transesterification) results in a partial conversion of the original triglyceride to a mixture of mono-, di-, and tri-glycerides. The triglyceride content of the resulting derivative may be as low as 5% by weight with the remainder being a mixture of monoglyceride and diglyceride with monoglyceride predominanting, generally at least 50% by weight of the mixture. For the purpose of the invention the mixture will be comprised of about 5–15% triglyceride, preferably 6–10%; 15–45% diglyceride, preferably 20–30% and 50–80%, preferably 60–75% monoglyceride. In the case of the polyol from soya oil, an illustrative preferred product is one containing about 6% triglyceride, 25% diglyceride, and about 69% monoglyceride.

The polyurethane prepolymers according to the invention contain free isocyanate groups. It is preferred to produce polyurethane prepolymers containing from about 5 to about 25% by weight of free isocyanate groups, based on the weight of the prepolymer. Polyurethane prepolymers containing from about 10 to about 20% by weight of free isocyanate groups, based on the weight of the prepolymer, are particularly preferred.

The reaction between the oleochemical polyol and the isocyanate to form the polyurethane prepolymer is normally carried out at temperatures of up to about 100° C., preferably over a range from room temperature, e.g. 20° C., up to moderately elevated temperatures, such as 50° C. Preferably, the quantity of aromatic isocyanate and oleochemical polyol component corresponds to a starting molar ratio of OH to isocyanate groups of from 1:4 to 1:12, more preferably, 1:4 to 1:11.

In addition to the polyurethane component and the polyol component, the polyurethane prepolymers according to the invention also contain other constituents which are known per se for such purposes from the prior art. The other constituents in question are primarily accelerators, flameproofing additives and blowing agents. However, the polyurethane prepolymers according to the invention may also contain viscosity regulators, i.e. liquefying agents, dyes and/or stabilizers. Compounds suitable for these respective functions are known to those skilled in the art.

The polyurethane prepolymers according to the invention may contain as accelerators any of the numerous compounds likewise known to the expert, including for example N substituted morpholines and mixtures thereof with propylene oxide adducts of triethanolamine. Preferred accelerators are 2,2'-dimorpholinodiethyl ether, n-ethyl morpholine, 2,2-bis-dimethylaminodiethyl ether or mixtures of these compounds.

Compounds known from the prior art are added to the polyurethane prepolymers according to the invention to establish the desired fire behaviour. Tris-(chloroalkyl)-phosphates or aryl phosphates are mentioned as examples of such compounds. Trichloroisopropyl phosphate (TCPP) or trichloroethyl phosphates (TCEP) for example may be used in quantities of from 8 to 15% by weight, based on the mixture of prepolymers, blowing agents and auxiliaries.

To produce polyurethane foams based on the polyurethane prepolymers according to the invention, it is also necessary to add the blowing agents known to the expert for this purpose. One particular advantage of the prepolymer mixtures according to the invention lies in their improved solubility in relation to the known blowing agents. Suitable blowing agents are compounds which are inert to the other components of the reaction mixture and which show such physical behaviour that, on expansion of the prepolymer mixture, they cause the product to foam. Suitable blowing agents are, for example, halogenated hydrocarbons having boiling points below 30° C. at normal pressure, such as for example monochlorodifluoromethane, dichloromonofluoromethane, dichlorodifluoromethane, trichlorofluoromethane and mixtures of these halogenated hydrocarbons. Other suitable blowing agents are readily volatile, non-halogenated hydrocarbons, such as for example propane, isobutane, dimethyl ether or mixtures thereof and also mixtures of the above-mentioned halogenated hydrocarbons and readily volatile, non-halogenated hydrocarbons.

Viscosity regulators, i.e. liquefying agents, dyes and/or stabilizers, for example foam stabilizers or stabilizers against photochemical and/or hydrolytic degradation, may be added as further auxiliaries to the polyurethane prepolymers according to the invention.

To vary the properties of the polyurethane prepolymers according to the invention and of the foams obtainable therefrom, other polyol components, which are not oleochemically derived, may be added in small quantities to the prepolymers in addition to the components mentioned. Generally such other polyols will not be added in amounts greater than about 40% by weight of the total polyol component and, preferably will be at levels not greater than 15 or 25% by weight. Polyester polyols are mentioned as an example of these other polyol components. Suitable polyester polyols are those synthesized from dicarboxylic acids having 6–12 carbon atoms and preferably adipic acid (or mixtures thereof with an aromatic acid such as isophthalic acid) with an alkylene glycol having 2–4 carbon atoms, preferably diethylene glycol, optionally in conjunction with 1,2-propylene glycol, and having OH numbers of from 50 to 160, more desirably about 100 to about 150. However, polyols containing amino groups may also be used alternatively or in addition to these polyester polyols. One example of a suitable amino polyol is the adduct of triethanolamine with propylene oxide in a molar ratio of 1:10–30. Castor oil is another suitable polyol for modification. The three polyol components mentioned may be additionally used in quantities of up to about 6%, based on the mixture of prepolymer, blowing agent and auxiliaries.

According to the invention, the polyurethane prepolymers containing an isocyanate component and a polyol component and also other components, such as accelerators, flameproofing agents, blowing agents and, optionally, liquefying agents, dyes and/or stabilizers, are prepared by initially subjecting epoxidized triglycerides of a fatty acid mixture containing at least partly olefinically unsaturated fatty acids to complete ring opening with one or more $C_1$–$C_{12}$ alcohols. Epoxidized triglycerides suitable for use in the process according to the invention are primarily those of fats and/or oils of vegetable and/or animal origin, preferably epoxidized soya oil, linseed oil and castor oil.

The ring opening of the epoxide is preferably carried out with a monohydric alcohol containing from 1 to 12 carbon atoms which may be straight or branched chain. In one particularly preferred procedure, an alcohol containing 1–3 carbon atoms selected from the group comprising methanol, ethanol, n-propanol and i-propanol or a mixture of these lower alcohols, is used as the monohydric alcohol. In one preferred embodiment of the process according to the invention, methanol is used as the monohydric alcohol.

The conditions under which the process step in question is carried out are well known to the expert. The usual reaction conditions, namely temperatures of from 50° to 120° C., preferably 60°–80° C., are applied. A considerable excess of the alcohol component is normally used for the ring opening reaction. Unreacted alcohol may be removed from the reaction mixture on completion of the reaction.

The opening of the epoxide ring is accompanied by alcoholysis or transesterification of the triglycerides, preferably using the same monoalcohols.

The last step of the process according to the invention comprises mixing the polyol component formed as described above with the isocyanate component and optionally, the other components used, such as accelerators, flameproofing agents, blowing agents and, optionally, liquefying agents, dyes and/or stabilizers (collectively referred to as blowing agents and auxiliaries).

However, as earlier noted it is also possible to use additional polyol components, for example polyester polyols synthesized from adipic acid and diethylene glycol, optionally in conjunction with 1,2-propylene glycol, and having OH numbers of from 50 to 160 or polyols containing amino groups, for example adducts of triethanolamine and propylene oxide in a molar ratio of 1:10–30 and also castor oil. These additional polyol components may contribute up to 40% by weight of the total quantity of polyols.

The polyurethane prepolymers according to the invention may be used as starting materials for the production of foams. The prepolymer mixture and the foams obtainable therefrom show distinct advantages over comparable products hitherto known from the prior art. Thus, the products according to the invention show distinctly better fire behaviour. In the fire test according to DIN 4102, they achieve the B2 classification ("normally inflammable"). In addition, the prepolymer mixtures according to the invention show considerably lower viscosity than comparable prior art mixtures. Their viscosity increases only slightly, even on cooling to 10°–0° C. Accordingly, the processibility of the prepolymer mixtures is distinctly superior to that of other polyurethane prepolymers, even at low temperatures. In addition, the mixture is not deactivated, even in the event of prolonged storage. The stability of the mixture in storage at typical storage temperatures or even at elevated temperature (40° to 50° C.) is very good to excellent, so that in this respect, too, the prepolymer mixtures according to the invention are superior to state-of-the-art prepolymer mixtures.

In addition, the preoplymer mixtures according to the invention foam and then harden at room temperature to give stable polyurethane foams having the required structure and strength.

EXAMPLES

Production of the starting materials

The OH-group-containing components were prepared in a heatable esterification reactor equipped with a reflux condenser and separator. The reactions were carried out under nitrogen.

I Soya Polyol 4.0 kg epoxidized soya oil (6.1% epoxide oxygen) and 2.95 kg anhydrous methanol (molar ratio epoxide:methanol=1:6) were heated with stirring for 8 hours at 65° C. in the presence of 0.2% by weight concentrated sulfuric acid. Thereafter the reaction was largely over and the excess sulfuric acid was neutralized with diethanolamine. After neutralization, excess methanol was distilled off, ultimately under a pressure of from 15 to 20 mbar. The reaction product had the following characteristics: OH number 235, saponification number 158, epoxide number 0. A Brookfield viscosity of 800 mPa·s was measured at 20° C. The content of mono-, di- and triglycerides was determined by liquid chromatography: triglyceride=6.4%, diglyceride=25.2%, monoglyceride=68.7%.

II Polyester polyol

A mixture of adipic acid and isophthalic acid (molar ratio 15:1) was reacted with diethylene glycol and 1,2-propylene glycol (molar ratio 1.36:1) in the same apparatus as described above. The ratio of total diol to total dicarboxylic acid was 1.46:1. After the reaction had started at 140° C., the temperature was increased to 200° C. over a period of 75 hours without addition of an esterification catalyst. Excess glycol was then distilled off at around 25 mPa. The reaction product was then run off. It had an OH number of 140, an acid number below 2 and a Brookfield viscosity at 20° C. of 1640 mPa·s (spindle 4/100 r.p.m.)

III Polyether polyol

The polyether polyol used was an adduct of 1 mole triethanolamine and 17 moles propylene oxide. It had a molecular weight of approx. 1100, an OH number of 150 and a Brookfield viscosity at 20° C. of 350 mPa·s (spindle 4/100 r.p.m.)

EXAMPLES 1 TO 3

The quantity in percent of soya polyol and polyester polyol used is shown beneath the Example number in Table 1 below. The quantities of tris-chloroisopropyl phosphate, tris-chloroethyl phosphate and 2,2-dimorpholinodiethyl ether used and the siloxane-oxyalkylene copolymer used are also shown. 4,4-diphenylmethane diisocyanate was added to the above mixture after the corresponding quantity of dichlorodifluoromethane or trichlorofluoromethane had been added.

The viscosity at 23° C. of the prepolymers obtained in the solution (80% in trichlorotrifluoroethane) was approximately 2100 mPa·s.

TABLE 1

| Example | 1 | 2 | 3 | 4 |
| --- | --- | --- | --- | --- |
| Soya polyol | 15.4 | 11.2 | 12.6 | 9.4 |
| Polyester polyol | — | 2.8 | 2.8 | — |
| Polyether polyol | — | — | — | — |
| Castor oil | — | — | — | 4.7 |
| Tris-(chloroisopropyl)-phosphate | — | 12.6 | — | 12.6 |
| Tris-(chloroethyl)-phosphate | 11.2 | — | 11.2 | — |
| 2,2-dimorpholinodiethyl ether | 0.3 | 0.3 | 0.3 | 0.3 |
| Siloxane/oxyalkylene copolymer | 1.1 | 1.1 | 1.1 | 1.0 |
| 4,4'-diphenylmethane diisocyanate | 35.0 | 35.0 | 35.0 | 35.0 |
| Dichlorodifluoromethane | 31.5 | 31.5 | 31.5 | 31.5 |
| Trichlorofluoromethane | 5.5 | 5.5 | 5.5 | 5.5 |

The froth mixture packed in standard containers was left to harden after foaming in gaps at 23° C./50% relative air humidity. After 14 days, the foam was tested for its fire behavior in accordance with DIN 4102; in particular, the maximal flame height in cm was measured.

The flame height was 14 cm in Examples 1, 2 and 4 and only 13 cm in Example 3; in other words, a B2 classification was achieved in every case.

COMPARISON TESTS A TO C

The formulations used for Comparison Tests a, b and c are shown in Table 2 below, the quantity of polyether polyol, tris-(chloroisopropyl)-phosphate or tris-(chloroethyl)-phosphate, siloxane/oxyalkylene copolymer and 4,4'-diphenylmethane diisocyanate used and also the blowing gases used being shown under the letters a to c.

TABLE 2

| Comparison Test | a | b | c |
| --- | --- | --- | --- |
| Polyether polyol (see page 12, line 23–27) | 15.7 | 14.3 | 15.7 |
| Tris-(chloroisopropyl)-phosphate | 11.2 | 12.6 | — |
| Tris-(chloroethyl)-phosphate | — | — | 11.2 |
| Siloxane/oxyalkylene copolymer | 1.1 | 1.1 | 1.1 |
| 4,4'-diphenylmethane diisocyanate | 35.0 | 35.0 | 35.0 |
| Dichlorodifluoromethane | 31.5 | 31.5 | 31.5 |

TABLE 2-continued

| Comparison Test | a | b | c |
|---|---|---|---|
| Trichlorofluoromethane | 5.5 | 5.5 | 5.5 |

The procedure was as described in Examples 1 to 4. The froth mixture foamed in gaps at 23° C./50% relative air humidity was left to harden and, after 14 days, was fire-tested in accordance with DIN 4102 as in the Examples. The maximum flame height was 20 cm in test a and 19 cm in tests b and c, i.e. the foams had to be given the B3 classification (=readily inflammable).

All the results of the fire tests are average values from five tests with the same material.

We claim:

1. In a polyurethane prepolymer containing terminal isocyanate groups which comprises the reaction product of (1) a stoichiometric excess of an isocyanate and (2) an oleochemical polyol, the improvement wherein said oleochemical polyol is obtained by (a) the complete ring opening of an epoxidized triglyceride of a fatty acid mixture having olefinic unsaturation with a $C_1$–$C_{12}$ alcohol to provide a triglyceride derivative containing substantially no epoxide groups and (b) partial conversion of said triglyceride derivative to an alkyl ester polyol in which the alkyl group contains from 1 to 12 carbon atoms.

2. A polyurethane prepolymer as defined in claim 1 wherein said epoxidized triglyceride is selected from the group consisting of epoxidized fats and oils of vegetable and animal origin.

3. A polyurethane prepolymer as defined in claim 2 wherein said epoxidized oil is selected from the group consisting of soya oil, linseed oil, castor oil, palm oil, peanut oil, sunflower oil and fish oils.

4. A polyurethane prepolymer as defined in claim 2 wherein said epoxidized oil is epoxidized soya oil.

5. A polyurethane prepolymer as defined in claim 2 wherein said epoxidized fat is beef tallow.

6. A polyurethane prepolymer as defined in claim 1 wherein said alcohol is selected from the group consisting of methanol, ethanol, n-propanol, isopropanol and mixtures thereof.

7. A polyurethane prepolymer as defined in claim 1 wherein said alcohol is methanol.

8. A polyurethane prepolymer as defined in claim 1 wherein said isocyanate is an aromatic isocyanate containing an average of 2–4 isocyanate groups per molecule.

9. A polyurethane prepolymer as defined in claim 7 wherein said isocyanate is 4,4'-diphenylmethane diisocyanate.

10. A polyurethane prepolymer as defined in claim 1 wherein an additional polyol is present in the polyol component for reaction with said isocyanate, said additional poloyol having a hydroxyl number of about 50–160.

11. A polyurethane prepolymer as defined in claim 10 wherein said additional polyol is a polyol selected from the group consisting of castor oil, an amino polyol adduct of triethanolamine and propylene oxide, a polyester polyol of the reaction of a dicarboxylic acid having 6–12 carbon atoms and an alkylene glycol in which the alkylene group contains 2–4 carbon atoms.

12. A polyurethane prepolymer as defined in claim 11 wherein said additional polyester polyol is the reaction product of a mixture of adipic acid and isophthalic acid with a mixture of diethylene glycol and 1,2-propylene glycol.

13. A polyurethane prepolymer as defined in claim 1 wherein the quantity of isocyanate and oleochemical polyol corresponds to a starting molar ratio of OH to NCO groups of about 1:4 to 1:11.

14. A process for producing the polyurethane prepolymer of claim 1 comprising the steps of mixing and reacting said stoichiometric excess of isocyanate and said oleochemical polyol at temperatures in the range of about 20° C. to 100° C.

15. A starting material for polyurethane foam comprising the polyurethane polymer defined in claim 1 and an effective amount of a blowing agent, said blowing agent being at least partially soluble in said polyurethane prepolymer.

16. A starting material as defined in claim 15 wherein said blowing agent is a chlorinated-fluorinated hydrocarbon.

17. A starting material as defined in claim 16 and further comprising an effective amount of a polyurethane foam catalyst.

18. A starting material as defined in claim 17 wherein said catalyst is selected from the group consisting of 2,2'-dimorpholinodiethyl ether, N-ethyl morpholine and 2,2-bis-dimethylaminodiethyl ether.

19. A starting material as defined in claim 15 and further comprising an effective amount of a flameproofing agent.

20. A process of making a polyurethane foam compositon having reduced flame height comprising (a) producing the polyurethane prepolymer defined in claim 1; (b) mixing with said polyurethane prepolymer effective amounts of (i) a blowing agent, said blowing agent being at least partially dissolved in said polyurethane; (ii) a catalyst and (iii) a flameproofing agent; (c) evaporating the blowing agent to form a foam; and (d) exposing said foams to water whereby a polyurethane foam is produced having reduced flame height.

* * * * *